United States Patent
Vignola et al.

(10) Patent No.: US 7,341,665 B2
(45) Date of Patent: Mar. 11, 2008

(54) PROCESS FOR THE TREATMENT OF CONTAMINATED WATER BASED ON THE USE OF APOLAR ZEOLITES HAVING DIFFERENT CHARACTERISTICS

(75) Inventors: Rodolfo Vignola, Monterotondo-Roma (IT); Umberto Cova, Rome (IT); Gino Della Penna, Monterotondo-Roma (IT); Raffaello Sisto, Rome (IT)

(73) Assignee: Enitecnologie S.p.A., San Donato Milanese (IT)

( * ) Notice: Subject to any disclaimer, the term of this patent is extended or adjusted under 35 U.S.C. 154(b) by 0 days.

(21) Appl. No.: 10/583,448

(22) PCT Filed: Dec. 6, 2004

(86) PCT No.: PCT/EP2004/013871

§ 371 (c)(1),
(2), (4) Date: Dec. 26, 2006

(87) PCT Pub. No.: WO2005/063631

PCT Pub. Date: Jul. 14, 2005

(65) Prior Publication Data

US 2007/0158272 A1    Jul. 12, 2007

(30) Foreign Application Priority Data

Dec. 22, 2003   (IT) .......................... MI2003A2549

(51) Int. Cl.
*B01D 15/04* (2006.01)
*C02F 1/42* (2006.01)

(52) U.S. Cl. ....................... 210/681; 210/688; 210/690; 210/691

(58) Field of Classification Search ................ 210/688, 210/687, 690, 691

See application file for complete search history.

(56) References Cited

U.S. PATENT DOCUMENTS

| 5,730,948 A | 3/1998 | Klatte et al. |
| 6,200,483 B1 * | 3/2001 | Cutler et al. ................ 210/685 |
| 2004/0206705 A1 | 10/2004 | Vignola et al. |

FOREIGN PATENT DOCUMENTS

| EP | 0 914 864 | 5/1999 |
| WO | 03 002461 | 1/2003 |

OTHER PUBLICATIONS

Pilchowski, Kurt et al., "Adsorptive Separation of 1,2-Dichloroethane from Model Wastewater by Natural Clinoptiolite", Acta Hydrochim. Hydrobiol., vol. 31, No. 3, pp. 249-252, 2003.
U.S. Appl. No. 10/583,448, filed Jun. 19, 2006, Vignola et al.

* cited by examiner

*Primary Examiner*—Chester T. Barry
(74) *Attorney, Agent, or Firm*—Oblon, Spivak, McClelland, Maier & Neustadt, P.C.

(57) ABSTRACT

A process is described for the treatment of water contaminated by apolar organic compounds and/or by heavy metals, which consists in circulating the water through a system comprising at least two types of zeolites having a silica/alumina ratio >50, placed in succession, wherein the first zeolite through which the water is passed is characterized by a high absorption capacity and structural channel dimensions ranging from 7 to 50 Å, whereas the second is characterized by a high removal capacity of molecules with a molecular diameter comparable with structural channel dimensions ranging from 5 to 7 Å.

19 Claims, 17 Drawing Sheets

Adsorption isotherms of benzene on ZSM-5 and Y Zeolite

One column system

Two column system

Gaschromatographic profile of the head space (GC-MS) of groundwater, in the feeding to the PRB simulation apparatus Gaschromatographic profile of the head space (GC-MS) of groundwater, at the outflow of the PRB simulation apparatus Gaschromatographic profile of the head space (GC-MS)

of water removed from the water-bearing stratum

Treatment of real water

Column (7,5x40cm)

0-20 cm Zeolite Y (50g); 21-40 cm ZMS-5 (50g)

Breakthrough at 20 cm (Y Zeolite)

Treatment of eal water

Column (7.5x40cm)

0-20 cm Y Zeolite (50g); 21-40 cm ZMS-5 (50g)

Breakthrough at 40 cm (ZMS-5)

Gaschromatographic profile of the head space of

Water at the inlet of the Y zeolite column

Gaschromatographic profile of the head space of water at the outflow of the Y zeolite column

PROCESS FOR THE TREATMENT OF CONTAMINATED WATER BASED ON THE USE OF APOLAR ZEOLITES HAVING DIFFERENT CHARACTERISTICS

The present invention relates to a process for the treatment of water contaminated by apolar compounds and/or heavy metals which is based on the use of two apolar zeolites having different characteristics.

More specifically, the invention relates to a process for the treatment of water contaminated by apolar compounds consisting of halogenated organic solvents and mono and polycyclic aromatic hydrocarbons, chloro-aromatic compounds, aliphatic hydrocarbons, oxygenated compounds present in fuels and/or heaving metals such as Arsenic, hexavalent Chromium, Antimonium, Selenium, Mercury, Cadmium, Cobalt, Nickel, Lead, Manganese and Copper, which is based on the use of a system comprising at least two types of apolar zeolites placed in succession.

The process according to the invention can conveniently be used for the treatment of groundwater contaminated by both low and high concentrations of apolar compounds using a permeable reactive barrier (PRB).

Conventional PRB for the decontamination of water contaminated by halogenated solvents are based on systems which use metallic iron and/or granular activated carbon (GAC).

The first system, which functions according to the reducing capacity of the metal, is only active towards reducible substances, such as organo-chlorinated products or metals with a high oxidation number (U.S. Pat. No. 5,266,213), WO 92/19556).

Furthermore, when a zero-valence iron is used, it causes a reduction in the permeability of the barrier due to encrustations or the precipitation of minerals which derive from the reactions between the ions of the oxidized metal and the substances contained in the groundwater.

The second system is an a specific absorbent and as such is poorly selective with respect to interfering substances present in the water and in particular groundwater (ions, humic acids, etc.). If used for the formation of permeable reactive barriers, it consequently causes an exhaustion of the system in short periods (Williamson, D. 2000. Construction of a funnel-and-gate treatment system for pesticide-contaminated groundwater. Chemical Oxidation and reactive barriers. Godage B. et al. Eds. In II Intl. Conf. On Remediation of chlorinated and recalcitrant compounds. Monterey, Calif., USA, Battelle Press, Columbus, (2000)), pages 257-264. Schad, H. 2000. Funnel-and-gate at a former manufactured gas plant site in Kalsruhe, Germany: design and construction. In: Chemical Oxidation and reactive barriers. Godage B. et al. Eds., II Intl. Conf. On Remediation of chlorinated and recalcitrant compounds, Monterey, Calif., USA, Battelle Press, Columbus, (2000), 215-322.

Both systems however prove to be ineffective in removing all the polluting principles often contemporaneously present in contaminated groundwater beneath industrial sites, which frequently consists of apolar compounds such as halogenated solvents and compounds deriving from the oil industry. These are often highly toxic products, some of which are carcinogenic, whose concentration in the groundwater must respect the strict limits established by the legislation.

In order to overcome the critical problems specified above, alternative procedures are proposed in the art, which are substantially based on the use of apolar zeolites as adsorbents for specific substances.

Zeolites are generally described as alumino-silcate complexes with a three-dimensional structure of cross-linked tetrahedrons having Al or Si atoms at the centre and oxygen atoms at the angles.

The tetrahedrons are combined according to a well-defined repetitive structure at the base of the formation of the cavities. For the neutrality of the structure, counter-ions, weakly bound to the structure and with a valence of two or more, are in the outer part of the channels. These counter-ions can be exchanged with other ions by ion exchange.

The crystalline zeolites contain regular channels capable of selectively adsorbing organic molecules (Occelli, M. L. and Robson, H. E. in Zeolite Synthesis. ACS Symposium Series. 1989. American Chemical Society). The hydrophobicity degree of zeolites is generally defined by the Si/Al ratio, hydrophobic zeolites have a high silicon content.

In practice, the substances pass into the pore system of the zeolite where they can be effectively and rapidly adsorbed thereby.

A process which is based on the use of zeolites is described, for example, in U.S. Pat. No. 4,648,977 wherein water contaminated by low concentrations of organic compounds, from 10,00 ppb to 20,00 ppm, is put in contact with an adsorbent mass consisting of an apolar zeolite.

The use of apolar zeolites is also described in patent application WO 03/0022461. In particular, patent application WO 03/0022461 relates to a process for the treatment of groundwater contaminated by permeable barriers whose reactive medium consists of apolar zeolites. The process allows contaminants which are difficult to eliminate, normally present in contaminated groundwater beneath industrial sites, to be effectively and selectively removed.

Zeolites have a higher absorption capacity and functioning duration with respect to that of materials currently used in permeable reactive barriers, such as activated carbon.

The properties of this reactive medium which are based on the dimension of the structural channels, suitably calibrated for organic molecules, and on the high a polarity, deriving from high silica/alumina ratios, exclude any type of interaction with ions or polar compounds.

The zeolite consequently has a selective interaction with molecules of apolar contaminants whereas it completely excludes ions and polar molecules normally present in groundwater together with humic substances, having high molecular dimensions than those of the structural channels.

Although water treatment processes based on the use of zeolites allow an effective and selective elimination of contaminants when these are present at low concentrations, they are less effective when they are present at high concentrations.

A process has now been found, which is based on the use of at least two types of zeolites placed in succession which, due to an unexpected synergic effect, allows organic contaminants to be effectively removed from water when they are present at both low and high concentrations.

Although this system excludes ions and polar molecules normally present in groundwater, from the structural channels, where the adsorption of apolar contaminants takes place, it has surprisingly proved to be effective in the removal of ions of heavy metals such as Arsenic, hexavalent Chromium, Antimonium, Selenium, Mercury, Cadmium, Cobalt, Nickel, Lead, Manganese and Copper.

An object of the present invention therefore relates to a process for the treatment of water contaminated by apolar organic compounds and/or heavy metals which consists in circulating the water through a system comprising at least two types of zeolites having a silica/alumina ratio >50, placed in succession, wherein the first zeolite through which the water is passed is characterized by a high absorption capacity and structural channel dimensions ranging from 7 to 50 Å, whereas the second is characterized by a high removal capacity of molecules with a molecular diameter comparable with structural channel dimensions ranging from 5 to 7 Å.

Zeolites which can be conveniently used in the process of the invention are those which have been subjected to a formulation process.

This process envisages that the zeolite micro-crystals, having dimensions of 1-10 microns, be agglomerated in formulates with ligands such as alumina ($Al_2O_3$), silica and clay to obtain particle sizes (0.2-4 mm) capable of ensuring the high permeability level necessary for the functioning of the PRB. The ligands normally consist of 20-60% by weight of the zeolites used.

In practice, the first zeolite through which the water passes, causes low adsorptions at low concentrations of contaminants and is capable, on the other hand of high adsorptions at high concentrations.

This zeolite is therefore effective in accumulating large quantities of contaminants allowing them to be reduced to medium-low concentration levels.

The second zeolite through which the water passes, generally has structural channel dimensions similar to those of the molecules of the contaminants to be removed. This zeolite allows the complete removal of the contaminants from the aqueous medium in which they are present at medium-low concentrations.

DETAILED DESCRIPTION OF THE INVENTION

Figure 1:
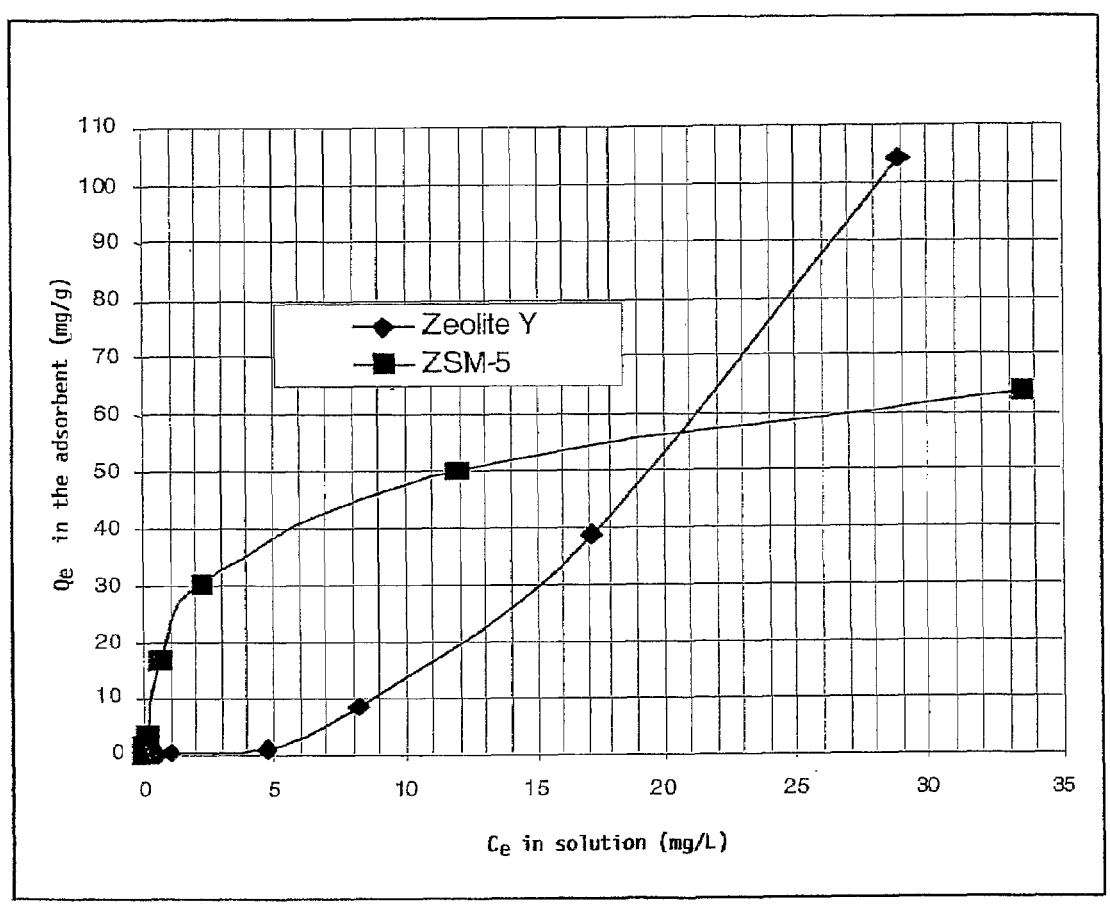
FIG. 1 represents the adsorption isotherms of benzene on two types of zeolite: ZSM-5 and Y zeolite.

The different behaviour of the two adsorbents is demonstrated in FIG. 1 which represents the adsorption isotherms of benzene on two types of zeolite: ZSM-5, characterized by the presence of structural channels with dimensions ranging from 5.1 to 5.5 Å, Y zeolite with channel dimensions of 7.4 Å.

From FIG. 1, it can be observed in particular, that ZSM-5 has a maximum adsorption capacity at low concentrations, allowing medium-low concentrations (0.1 to 5 mg/l) of contaminants to be completely eliminated from the aqueous solution, whereas Y Zeolite, with a lower adsorption capacity for pollutant concentrations up to 5-10 mg/l, is extremely effective at high concentrations (70-80 mg/l).

Neither of the two zeolites, however, is individually capable of treating high concentrations, as the first is rapidly saturated, leaving most of the contaminant in solution, whereas the second is incapable of intervening on concentrations below a medium-low limit, around 10 ppm.

In addition to creating the conditions for a high permeability of the adsorbing system, necessary for functioning for times (10-20 years) compatible with the use in situ of the PRB, the suitably formulated zeolites allow a better removal of heavy metals.

The zeolite system of the present invention preferably consists of zeolites with silica/alumina ratios >200.

Zeolites characterized by channels having dimensions of 7-50 Å and large cavities are, for example, Y Zeolite, beta zeolite, MSA, ERS-8 and MCM-41.

Y Zeolite is preferably used.

Examples of zeolites of the second type are silicalite, ZSM-5 zeolite and Mordenite.

ZSM-5 is preferably used.

The process according to the invention is particularly effective in removing pollutants consisting of styrene, p-xylene, benzo-anthracene, benzo-pyrene, benzo-fluoroanthene, benzo-perylene, chrysene, pyrene; halo-genated solvents such as carbon tetrachloride, tetrachloro-ethylene (PCE), trichloro-ethylene (TCE), 1,2-cis-dichloro-ethylene (1,2-cDCE), 1,2-trans-dichloro-ethylene (1,2-tDCE), 1,1-dichloro-ethane, (1,1-DCA), 1,2-dichloro-ethane, (1,2-DCA), hexachloro ethane (HCA), hexachloro-butadiene (HCBd) vinyl chloride (VC), chloromethane, trichloro methane, 1,1-dichloroethylene, 1,2-dichloropropane, 1,1,2-trichloro-ethane, 1,2,3-trichloropropane, 1,1,2,2-tetrachloro-ethane, monochlorobenzene (CB), 1,2-dichlorobenzene, 1,4-dichlorobenzene, 1,2,4-trichlorobenzene, 1,2,4,5-tetrachlorobenzene, pentachlorobenzene, hexachlorobenzene, 2-chlorophenol, 2,4-dichlorophenol, 2,4,6-trichlorophenol, pentachlorophenol, and aliphatic and/or aromatic compounds deriving from the oil industry such as methyl tert-butylether (MTBE), ethyl-tert-butylether (ETBE), tert-amyl-methyl-ether (TAME), BTEX (benzene, toluene, ethyl benzene, xylenes), styrene, naphthalene, 2-methyl-naphthalene, acenaphthene, phenanthrene.

The process according to the invention also allows ions of heavy metals such as Arsenic, hexavalent Chromium, Antimonium, Selenium, Mercury, Cadmium, Cobalt, Nickel, Lead, Manganese and Copper, to be effectively removed from water.

It has been found that ZSM-5 zeolite has a particular affinity and adsorption capacity with respect to 1,2-DCA, and consequently ZSM-5 zeolite can also be used alone for removing low concentrations of 1,2-DCA.

The system consisting of Y Zeolite followed by ZSM-5 zeolite has proved to be particularly efficient in the removal of organic contaminants.

Due to an unexpected synergic effect, the system of the present invention allows contaminants to be treated up to the limits of the law, at concentrations ranging from 5-2000 ppm and preferably within the range of 30-100 ppm, with a high overall adsorption capacity.

Systems comprising ZSM-5 zeolite have proved to be particularly suitable for aliphatic, halogen-aliphatic and mono-aromatic molecules, such as BTEX and halogen-benzene derivatives.

Systems comprising Mordenite, on the other hand, are more appropriate for aromatic molecules with two or more aromatic rings, and halogen- and alkyl-substituted, and ethers such as MTBE.

The process according to the invention can be conveniently used for the decontamination of groundwater with the use of permeable reactive barriers (PRB). In this case, the system of two zeolites placed in succession forms the active medium of the barrier, situated in situ perpendicular to the groundwater flow, through which the passage on the part of the polluted stream allows decontamination by immobilization of the contaminating species.

The barriers can treat groundwater polluted by chlorinated solvents, mono- or poly-cyclic aromatic hydrocarbons and compounds particularly resistant to biodegradation and adsorption such as MTBE, VC or 1,2-DCA with a high selectivity with respect to inorganic interfering agents.

The barriers can also effectively treat polluted groundwater from heavy metals such as Arsenic, hexavalent Chromium, Antimonium, Selenium, Mercury, Cadmium, Cobalt, Nickel, Lead, Manganese and Copper.

The following examples refer to water containing high concentrations of organic compounds subjected to treatment first with the single zeolites, Y Zeolite and ZSM-5, and then with the same zeolites in a mixture and subsequently with the system of the two zeolites placed in succession: the greatest efficiency obtained with the two zeolites in succession is evident.

The system consisting of Y Zeolite and ZSM-5 zeolite and Mordenite placed in succession proved to be particularly effective for the treatment of water containing mixtures of hydrocarbons, such as BTEX, and ethers such as MTBE.

Description of the Methods Used for Measuring the Properties of the Active Materials General Procedure Batch Tests The materials, in a quantity of 10 mg, unless otherwise specified, are incubated in 20 ml of water in a tube with a Teflon cap closed with a metallic ring and with the minimum head space to allow stirring; the contaminating compound (up to 100 µl of an aqueous substance at a suitable concentration) is added with a 100 µl syringe; the stirring is effected in a complete rotation system (powder mixer). At the end of the reaction, after 24 hours, i.e. at much higher times than the equilibrium times determined for each adsorbent, the mixture is centrifuged for 15' at 700 rpm to separate the adsorbing material and the unabsorbed contaminant is determined from its residual concentration in solution. Each determination is effected at least three times. For each determination, the sample and control consisting of liquid and contaminant without adsorbent, are prepared under the same conditions. This procedure was followed for all the contaminants tested.

Determination of the Equilibrium Times

From 10 mg to 1 g of adsorbing material are incubated with 20 ml of water containing from 100 ppb to 5 ppm of contaminant under stirring at room temperature for times varying from 15' to 48 h. The equilibrium time is considered as being that over which adsorption has not increased. In studying the effects of the adsorption conditions, the quantity of adsorbent was used, which causes the adsorption of at least half of the contaminant put in contact.

Column Tests

The adsorption tests with synthetic water containing mixtures of contaminants or with real groundwater were carried out in columns.

Zeolites subjected to a formulation process, and in particular Y Zeolite in pellets having a diameter of 3 mm (clay ligand), ZSM-5 and Mordenite in pellets having a diameter of 1.5 mm (alumina ligand), were used in the column tests. Bearing in mind the diameter of the formulated zeolites, the columns were prepared to have a column diameter/adsorbing particle diameter ratio >50, this value being necessary for guaranteeing the absence of preferential channels or wall effects during the treatment. The columns (having dimensions of 2.5×20 cm or 7.5×40 cm according to the diameter of the particles) also have sampling points (mininert) for following the saturation along the column. The filling of the columns is effected with suitable quantities of zeolites mixed with sand with the same particle size.

The water containing the contaminant, inserted in a deforming tedlar-bag to ensure the homogeneity of the solution with time, is pumped into the column in up-flow, at suitable flow-rates, with a peristaltic pump. The eluate is collected in a fraction collector in tubes equipped with a Teflon top for immediate gas-chromatographic analysis. The performances are determined by the Breakthrough curve, indicating, in abscissa, the eluted volume or time and in ordinate, the relative concentration (eluted concentration/initial concentration: $C/C_0$).

Analysis of the Metals

The analysis of the metals was effected with atomic absorption Varian FS 220, GTA 110 using the routine methods defined by the manufacturer.

Analysis of TCE, PCE, VC, DCA, Toluene, MTBE, naphthalene, 2-methyl-naphthalene, acenaphthene, phenanthrene (in Solution)

The aqueous solution is extracted with hexane in a ratio of 5.666/1 ($H_2O$/hexane), in an analogous tube to that used for the reaction; a milliliter of hexane is removed for analysis in GC-ECD or GC-FID. The control consists of the sample, without absorbent, subjected to the same treatment.

GC/MS Analysis of Real Groundwater Containing Complex Mixtures of the Contaminants Examined The analysis is effected from suitable aqueous solutions by measuring the contaminants in the head space. The system used was GC/MS/DS Mod. MAT/90 of Finnegan; the gas chromatographic column used was a PONA (length 50 m×0.21 mm I.D. and 0.5 µm of film) of Hewlett-Packard. The flowrate of the carrier measured at 35° C. proved to be 0.6 ml/min (Helium). Of each sample, 500 µl of the head space were injected, removing with a gas syringe (heated) from the phial kept for 2 h at 70° C. to equilibrium. The mass spectrometer operated in E.I. (electronic impact) at 70 eV and at a resolution of 1500 within the mass range of 30-120 a.m.u. and at a scanning rate which was such as to acquire a spectrum every 0.8 s.

Effect of the Ionic Strength and pH on the Adsorption

The adsorption is effected at different concentrations of $CaCl_2$: 5-100 mM; with respect to the pH, solutions were tested at pH of 6, 7, 8 obtained with a 20 mM Na-Phosphate buffer.

EXAMPLE 1

Removal of Arsenic with Formulated Zeolites and Comparison with Commercial Products A solution of 20 ml of water containing arsenic (As) as $As_2O_3$ and 50 mg of a suitable zeolite, formulated with $Al_2O_3$, brought to pH=7, is stirred for 24 hours in a tube with a hermetically closed top; the system is compared with commercial adsorbents, ZS500As, specific for arsenic, and AS500RW, cabazite, used as metal ion exchanger, both products of GSA Resources (http://www.gsaresources.com/prod0526.htm). The results are indicated in Table 1.

EXAMPLE 2

Removal of Various Quantities of Arsenic with Zeolites Formulated with Differing Quantities of $Al_2O_3$ Ligand The experiment was carried out as in the previous example with zeolites formulated with varying quantities of ligand. The experiment was effected with different concentrations of Arsenic in solution. The results are indicated in Table 2.

EXAMPLE 3

Removal of Hexavalent Chromium with Zeolites Formulated with the Same Quantity of Ligand The experiment is analogous to the previous example except that hexavalent chromium ($K_2Cr_2O_7$) is added at different concentrations to the aqueous solution. The results are indicated in Table 3.

EXAMPLE 4

Batch tests: 20 ml of a solution of contaminant at a suitable concentration is treated in a glass tube equipped with a Teflon top, with 5 mg of adsorbent consisting of single zeolites, in mixtures or two treatments in succession of the two single zeolites so as to have, as a whole, in the two treatments, the same quantity of adsorbent used in each of the tests with the single zeolites. After an hour in a rotating stirrer, the mixture is subjected to centrifugation at about 5000 rpm. The contaminant remaining in solution is determined on the supernatant, with suitable gas-chromatography, determining by difference that adsorbed in the adsorbent. The results of these tests are indicated in Table 4.

EXAMPLE 5

As Example 4 with toluene instead of benzene.

The results obtained with water contaminated by high concentrations of toluene subjected to treatment with Y Zeolite and ZSM-5 first separately and in a mixture, then in succession, are indicated in Table 5.

As can be observed, ZSM-5 and Y Zeolite are not very effective when used alone or in a mixture at high concentrations whereas when in succession, they significantly reduce the concentration of the contaminants.

EXAMPLE 6

As Example 4 with p-xylene instead of benzene.

Table 6 indicates the results obtained with p-xylene using Y Zeolite and ZSM-5, which confirm what is observed with benzene and toluene.

EXAMPLE 7

As Example 4 with monochloro-benzene (CB) instead of benzene.

The results, indicated in Table 7, clearly demonstrate that the substitution on the ring of either methyl groups (toluene) or halogens (CB) does not have a substantial effect on the adsorption capacity of Y Zeolite.

EXAMPLE 8

As Example 4 with tetrachloro-ethylene (PCE) instead of benzene.

Another group of compounds treated are organo-chlorinated alkanes and alkenes. The results are indicated in Table 8.

EXAMPLE 9

As Example 4 with trichloro-ethylene (TCE) instead of benzene. The results are indicated in Table 9.

EXAMPLE 10

Treatment of 1,2-dichloro-ethane (1,2-DCA) with ZSM-5.

Figure 2:
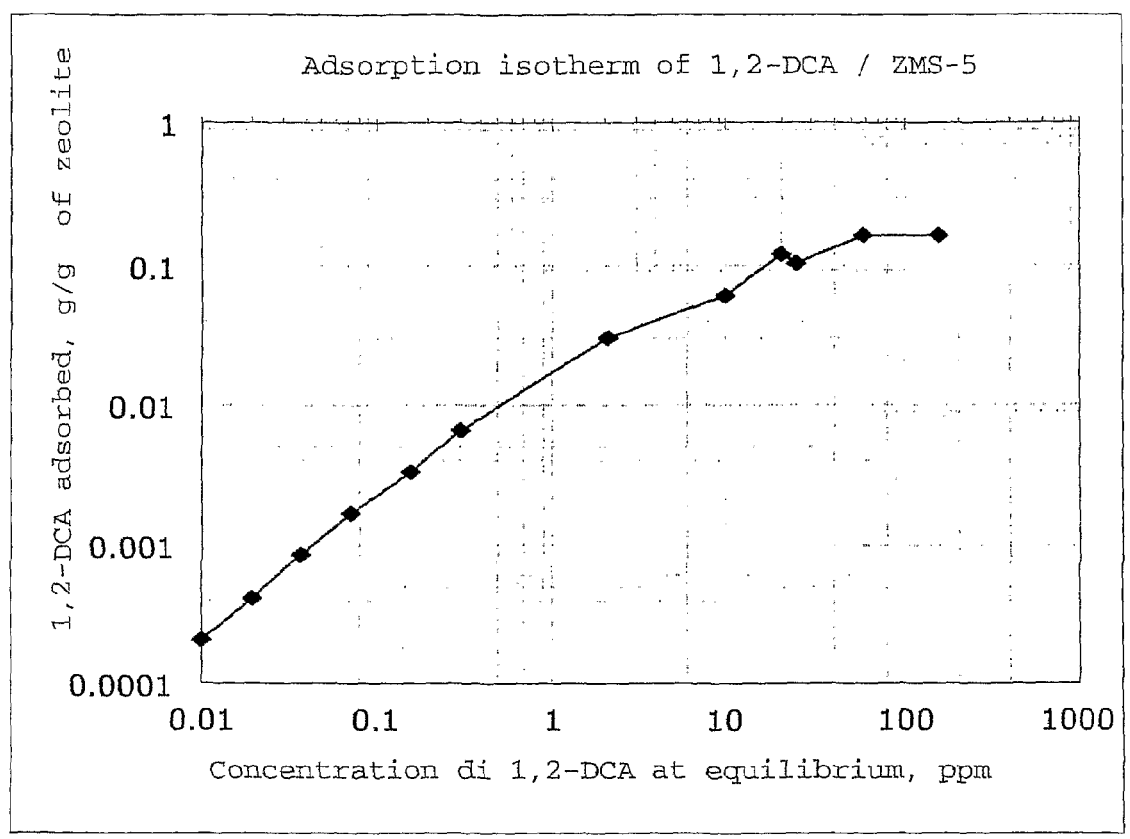
FIG. 2 shows the results of treatment of 1,2-dichloro-ethane with ZSM-5.

The adsorption in batch of 1,2-DCA on ZSM-5 zeolite, shows a high capacity, up to about 160 mg of 1,2-DCA adsorbed per gram of zeolite, in equilibrium with a solution of about a hundred ppm. The results obtained are indicated in FIG. 2 in which the initial concentration of 1,2-DCA present in the water initially subjected to the treatment, varies from 200 ppm to 60 ppb.

The tests, effected in batch in 20 ml vials with about 5 mg of zeolite, allow the quantity of organic compound adsorbed to be determined, together with that remaining in solution, called Ce concentration in equilibrium with the solid. The concentration in solid phase compared with that in equilibrium allows the adsorption isotherm to be constructed, from which it is possible to obtain the adsorption capacity with the Freundilich equation. The data from which the isotherm is obtained, are indicated in Table 10.

EXAMPLE 11

Dynamic adsorption tests (in columns) of mixtures of chlorinated organic contaminants in synthetic water.

Figure 3:
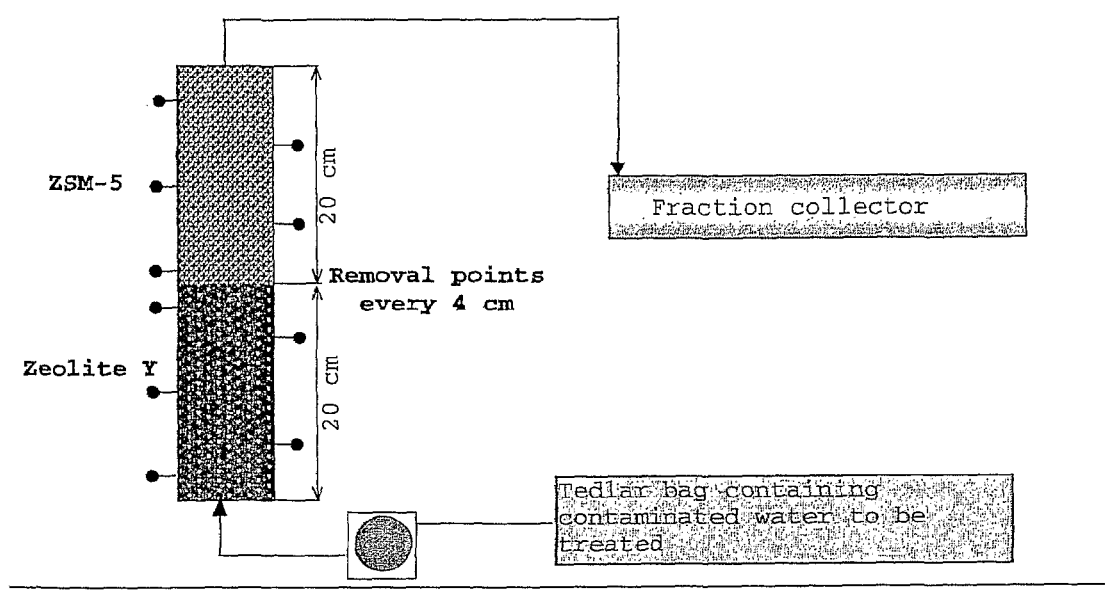
FIG. 3 illustrates a system consisting of a column whose first 20 cm are occupied by Y Zeolite and the rest by ZSM-5.

The system, illustrated in FIG. 3, consists of a column whose first 20 cm are occupied by Y Zeolite and the rest by ZSM-5.

The column is eluted from below at a flow-rate of 25 ml/h equal to about 50 cm/day of linear velocity. The water to be treated, pumped into the column from below with a peristaltic pump, contains a mixture of contaminants at the following concentration (mg/L): trichloro-ethylene (TCE) 367; 1,2-dichloro-ethane (1,2-DCA) 35; Toluene 40.

The concentration of contaminants, after passage through the bed of zeolites, proved to be the following (mg/L):
TCE 14; 1,2-DCA 4; toluene 0.4, at the outlet of Y Zeolite (after 20 cm)
TCE 0.005; 1,2-DCA 0.002; toluene 0.001, at the outlet of ZSM-5 (after 40 cm).

EXAMPLE 12

Treatment of actual water contaminated by chlorinated alkanes and alkenes with the system Y zeolite/ZSM-5 in succession.

The water removed from the water-bearing stratum of a petrochemical establishment, was characterized.

A quantitative analysis of the organic and inorganic compounds proved to be the following:
Organic compounds (mg/l): 1,2-dichloro-ethane (1,2-DCA) 37; tetrachloro-ethylene (PCE) 3.5; trichloro-ethylene (TCE) 2; 1,2-cis dichloro-ethylene (1,2-cDCE) 3.16; vinyl chloride (VC) 3.3; hexachloro-ethane (HCA) 1.6; hexachloro-butadiene (HCBd) 1.42.
Inorganic compounds (mg/l): Na 2860; Ca 723; Mg 315; Fe 1.6; $Cl^-$ 5500; Sulfates 200; Nitrates 154.

Figure 4:
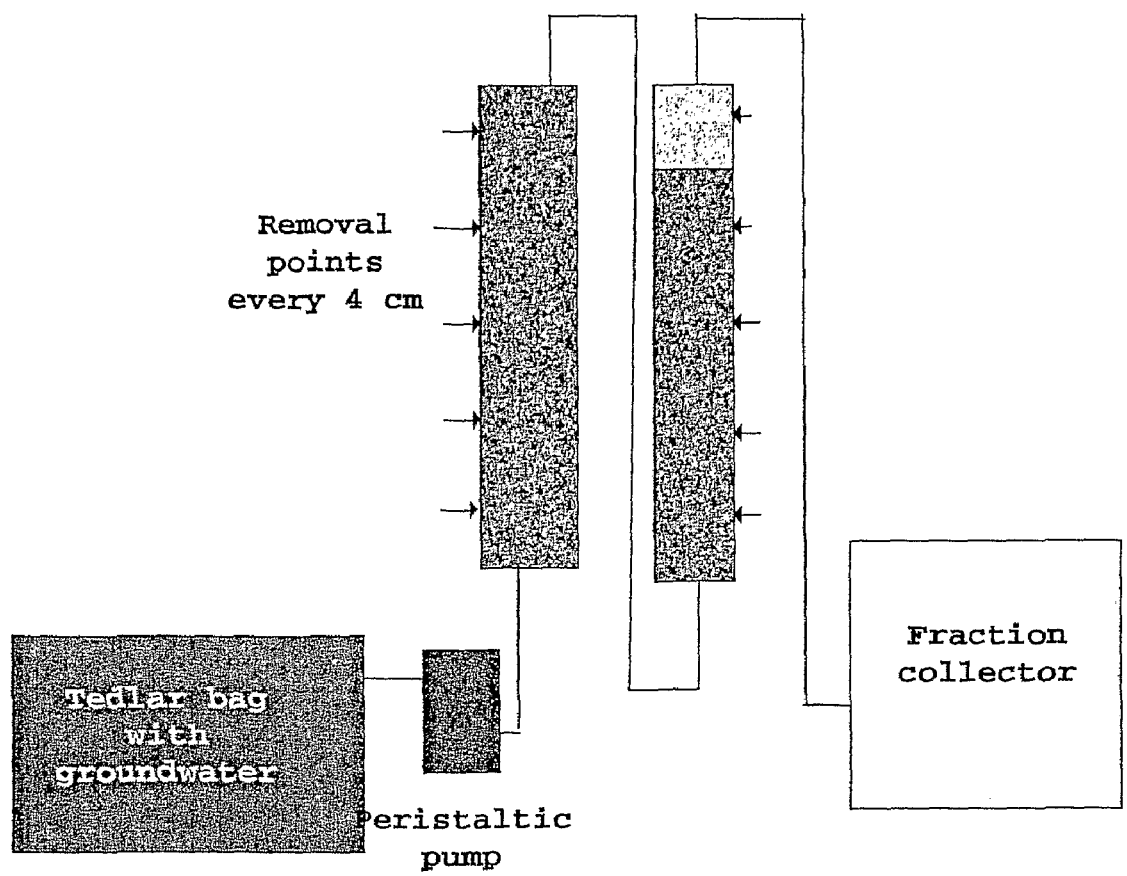
FIG. 4 shows the simulation apparatus used for the treatment of actual water contaminated by chlorinated alkanes and alkenes with the system Y Zeolite/ZSM-5 in succession.

The simulation apparatus used for the treatment is schematized in FIG. 4.

Two columns of 2.5×20 cm were set up in series, the first filled with 25 g of Y Zeolite and 93.5 g of sand (particles with a diameter of 3 mm) and the second, in the first section (18 cm) with 20 g of Y Zeolite and 90 g of sand, and in the second section (2 cm) with 2.5 g of ZSM-5 and 9.5 g of sand. The columns were eluted at a flow-rate, regulated by a peristaltic pump, of about 10 ml/h equal to about 48 cm/day.

After 10 months of functioning, during which about 75 litres of groundwater were treated, the concentration of the contaminants in the stream at the outlet of the simulation apparatus was maintained at values lower than the analytical measurement limits (<0.1 ppb).

Figure 5:
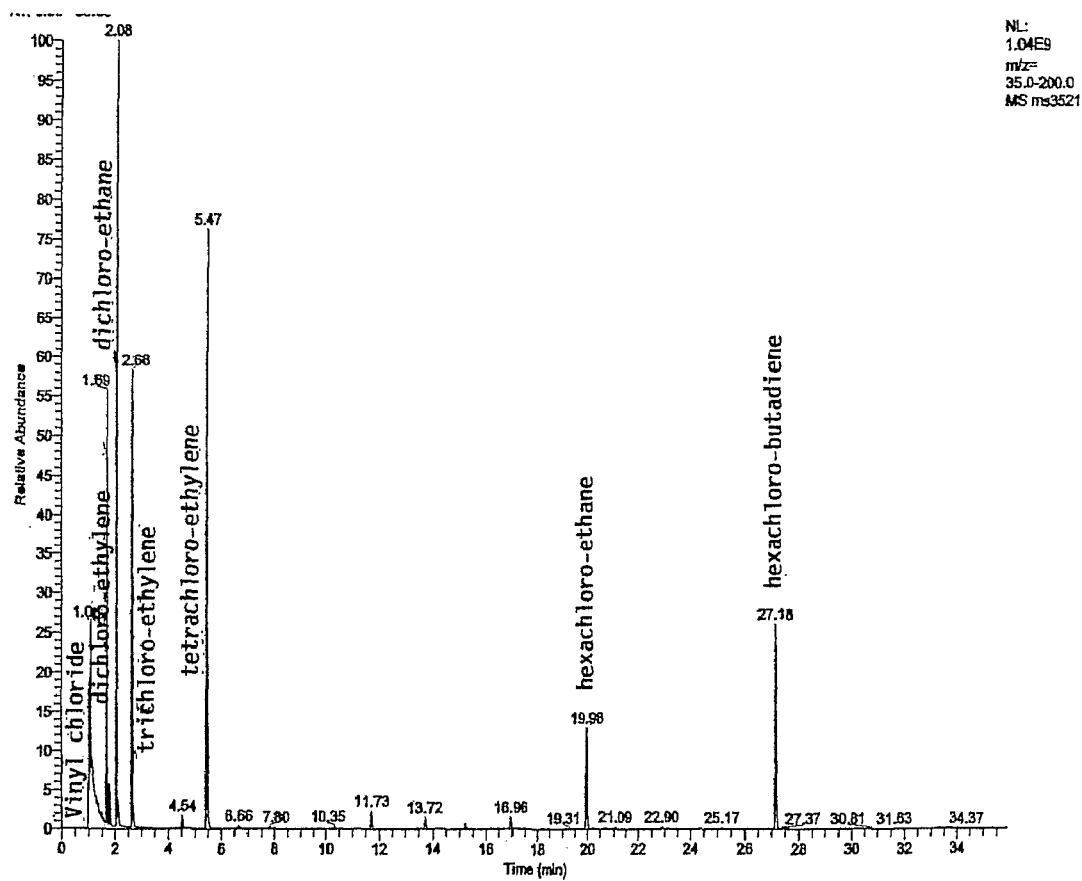
FIG. 5-6 show the gas chromatograms of the head space obtained by analyzing the feeding and outflow of the PRB simulation apparatus operating in a laboratory, containing a combination of Y Zeolite/ZSM-5.
Figure 6:
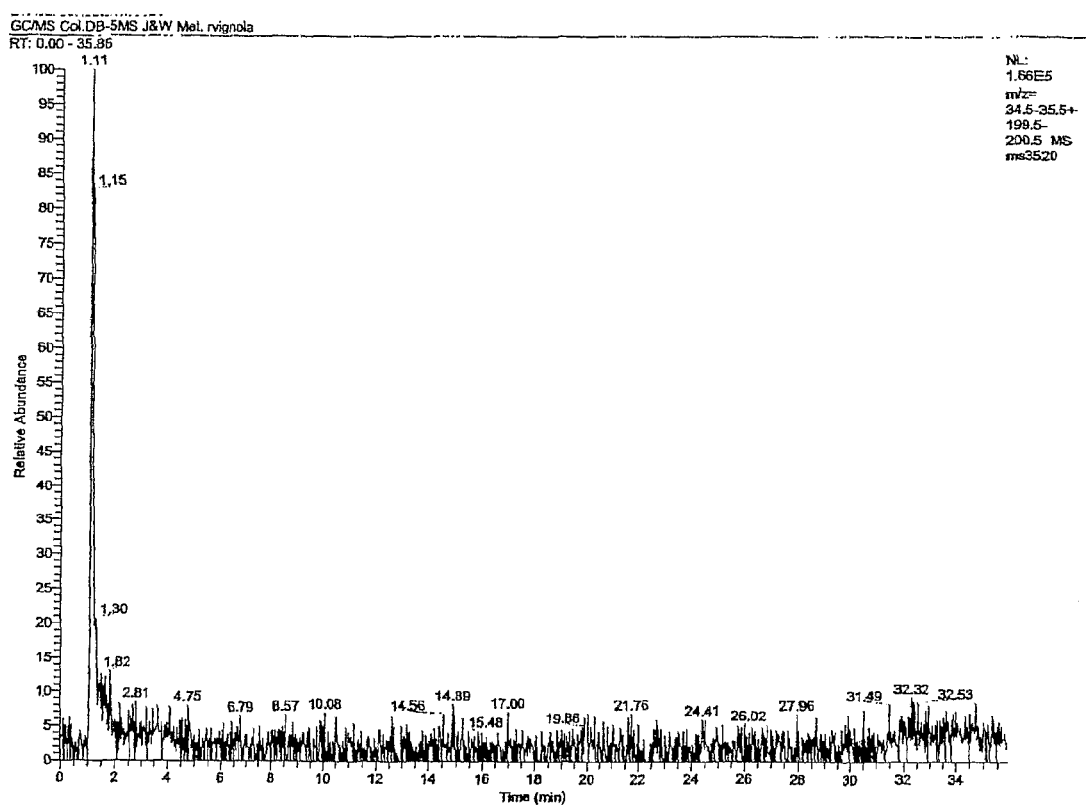

FIGS. 5 and 6 show the gas chromatograms of the head space obtained by analyzing the feeding and outflow of the PRB simulation apparatus operating in a laboratory, containing a combination of Y Zeolite/ZSM-5.

Table 11 also indicates the concentrations of contaminants determined inside and at the outflow of the reactive element contained in the first column, consisting exclusively of Y Zeolite.

The adsorption capacity for 1,2-DCA under the experimental conditions, can be calculated from the performances of the simulation system.

Adsorption capacity in a dynamic system refers to the quantity of organic substance adsorbed per gram of zeolite in correspondence with a halving of the initial concentration. In the simulation apparatus, this halving, after the elution of 75 litres of groundwater (3.4 g of 1,2-DCA), takes place before passage over 12 cm of Y Zeolite (15 g of saturated zeolite), from which there is an absorption capacity of not less than 15% by weight.

This capacity value is even more significant if compared with that of activated carbon which is around 0.3% (Engineering and Design Adsorption, Design Guide 2001. Publication Nr. DG 1110-1-2 www.usace.army.mil/usace-docs/design-guides/dg1110-1-2/contents.htm).

EXAMPLE 13

Treatment of real water contaminated by high concentrations of aromatic hydrocarbons with the system Y zeolite/ZSM-5 in succession.

Figure 7:
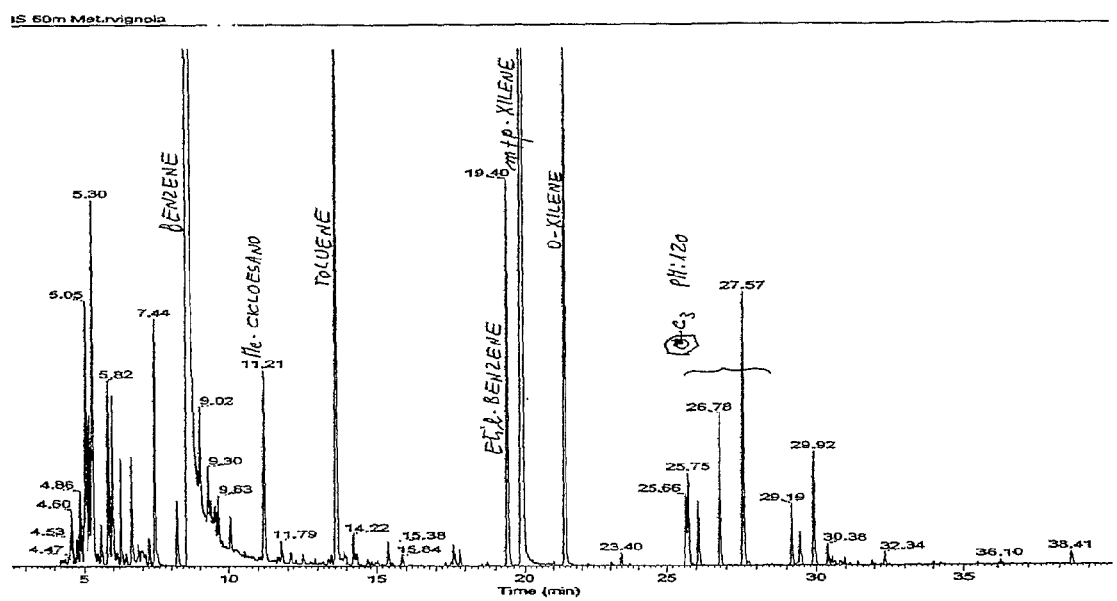
FIG. 7 shows the gas chromatographic profile of the water removed from the water-layer of the treatment of real water contaminated by high concentrations of aromatic hydrocarbons with the system Y Zeolite/ZSM-5 in succession.

The gas chromatographic profile of the water removed from the water-layer is indicated in FIG. 7.

A quantitative analysis of the most representative contaminants:
Organic compounds (mg/l): benzene 66; toluene 1.3; p-xylene 3.18; MTBE 0.86.
Inorganic compounds (mg/l): Na 5770; Ca 823; Mg 534; Fe 2.6; $Cl^-$ 7500; Sulfates 310; Nitrates 199.

The treatment was effected with a simulation system comprising a column (7.5×40 cm) filled with sand having a particle size of 1-2 mm, containing in the first 20 cm, 50 grams of Y Zeolite, and in the second 20 cm, 50 grams of ZSM-5.

The flow-rate, controlled by means of a peristaltic pump, was 33 ml/h corresponding to about 43 cm/day, considering that the empty volume of the column is 750 ml.

Figure 8:
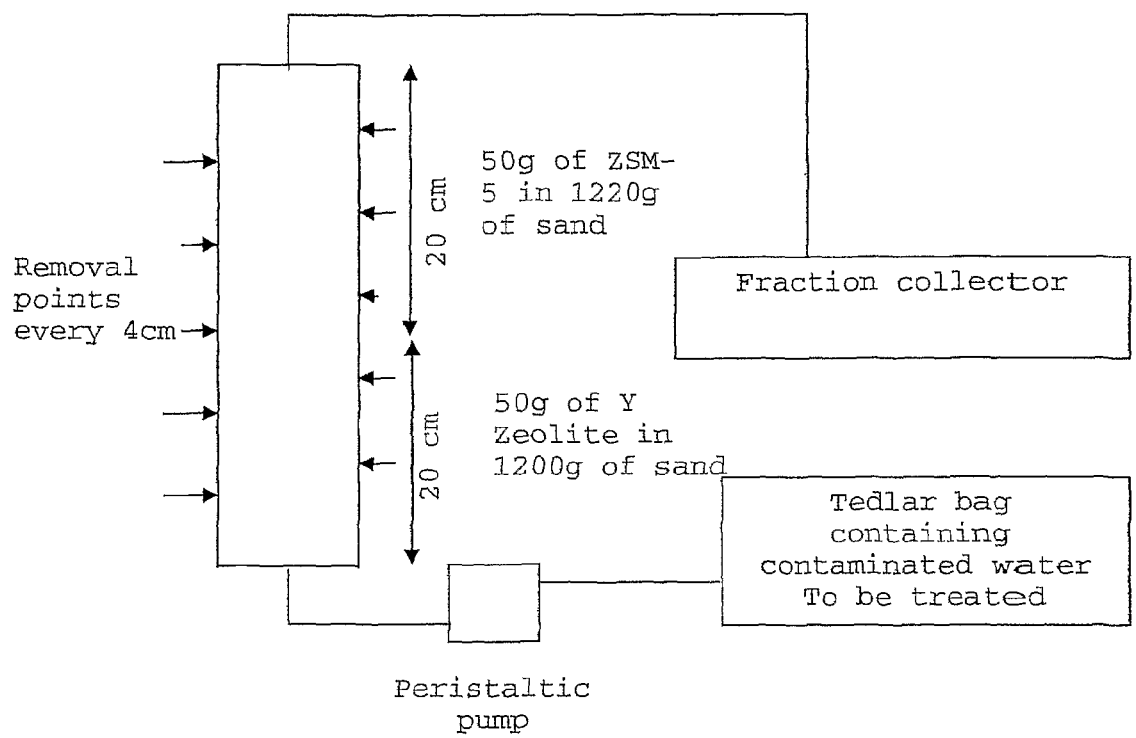
FIG. 8 shows the scheme of the treatment of real water contaminated by high concentrations of aromatic hydrocarbons with the system Y Zeolite/ZSM-5 in succession.

The scheme is shown in FIG. 8.

Figure 9:
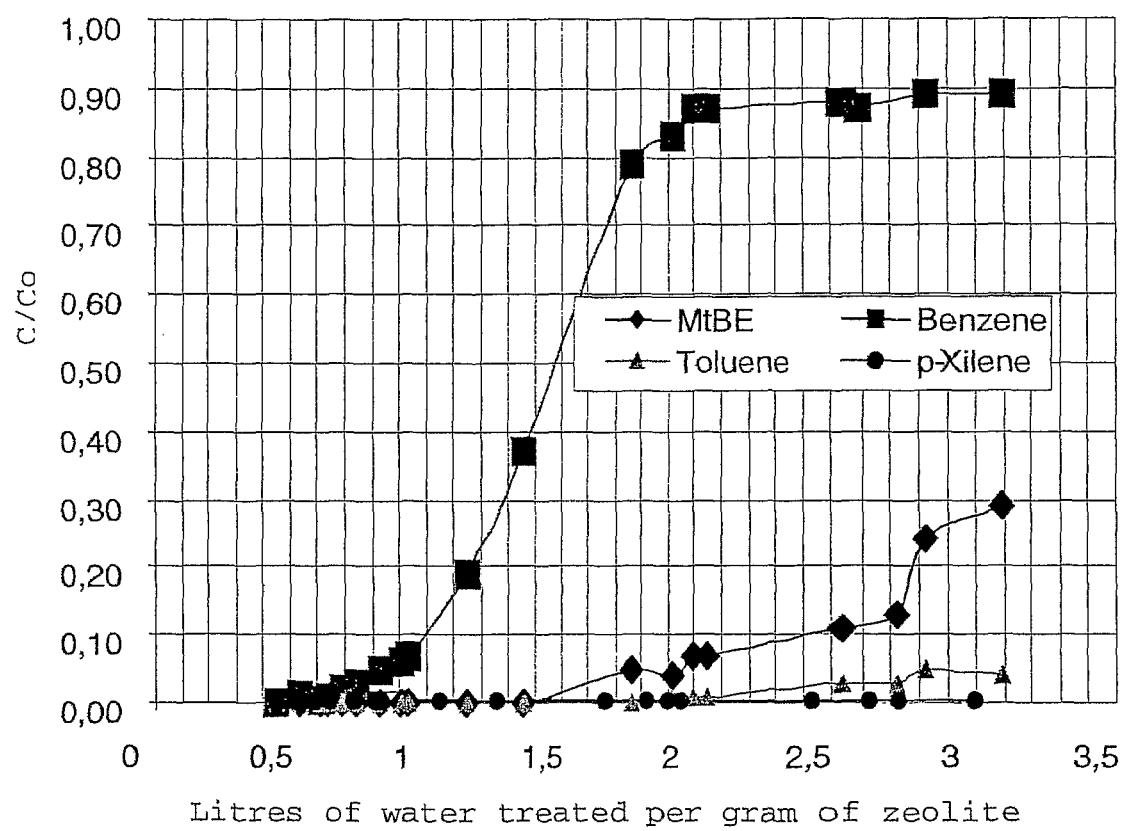
FIG. 9-10 indicate the results of tests using the scheme depicted in FIG. 8.
Figure 10:
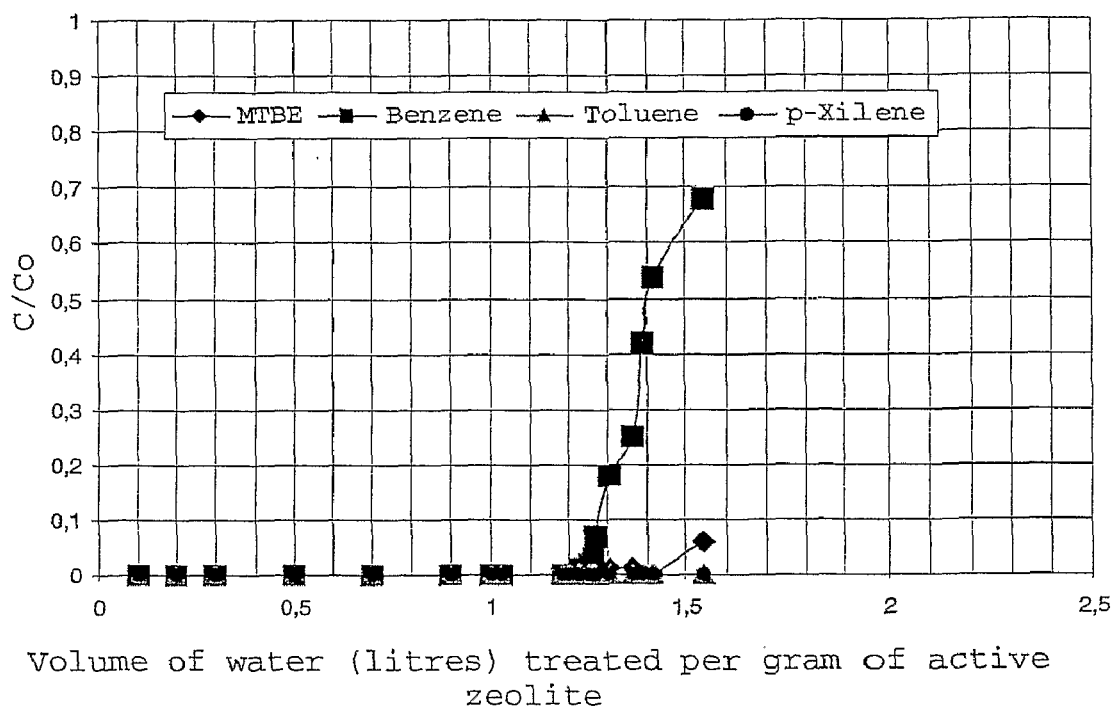

The results, indicated in FIGS. 9 and 10, show elution after 20 cm, at the end of the area defined by Y Zeolite (50 g of adsorbent), and after 40 cm, complete system of Y Zeolite and ZSM-5 (100 g of adsorbent). It is important to observe both the efficacy of Y Zeolite, with a capacity of about 10% against a total capacity of Y Zeolite+ZSM-5 of about 8%, and also the effect of ZSM-5 which allows the limits of law to be obtained in the eluate for the different components.

It should be pointed out that the treatment of water contaminated by these compounds at the concentrations tested with traditional systems, coal, air sparging or biological systems, does not seem to be very competitive with respect to the system in question, both for the presence of MTBE, which in itself is difficult to treat, and benzene, at concentrations not accessible to bacteria both in aerobiosis and in anaerobiosis.

EXAMPLE 14

Treatment of actual water contaminated by high concentrations of oxygenated hydrocarbons (MTBE) and aromatic products (BTEX) with the system in succession consisting of Y zeolite followed by ZSM-5/mordenite.

Quantitative analysis of groundwater.
Organic compounds (mg/l): MTBE 17.83; Benzene 22.83; Toluene 0.536; Ethyl benzene 1.48; p-xylene 2.94; o-xylene 1.27.
Inorganic compounds (mg/l): Na 6370; Ca 733; Mg 464; Fe 1.6; $Cl^-$ 8500; Sulfates 430; Nitrates 295.

The simulation apparatus consists of two columns of 7.5×40 cm, the first filled with 150 g of Y Zeolite, in the second, the first 20 cm are filled with ZSM-5 (100 g) and the second with Mordenite (150 g).

Figure 11:
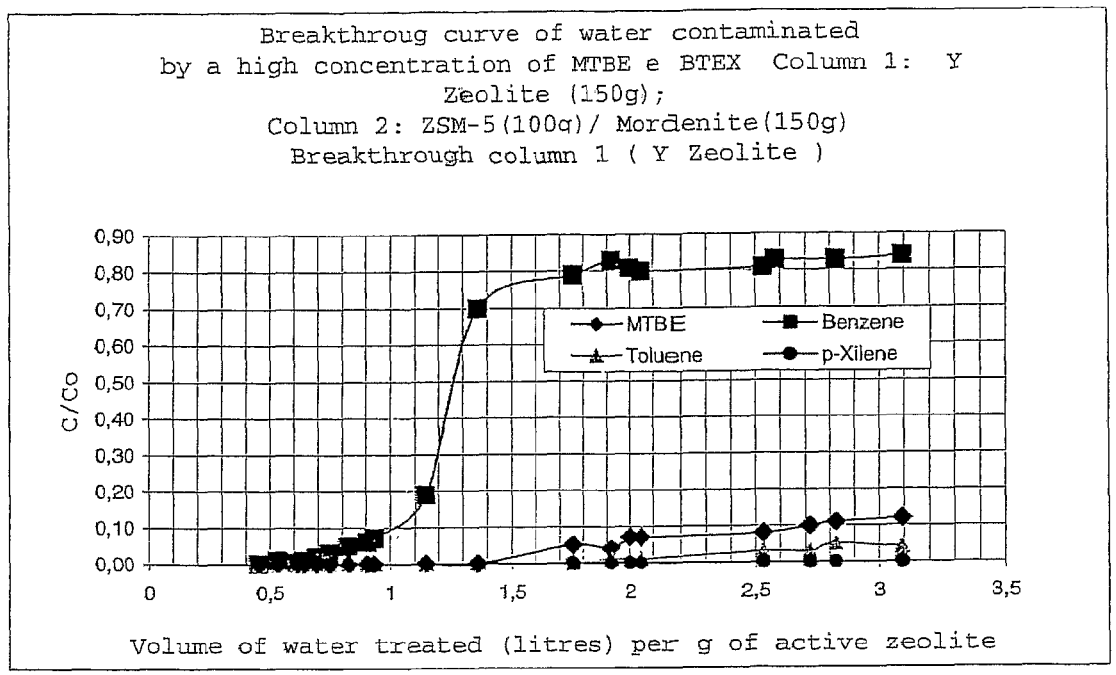
FIG. 11 shows test results of treatment of actual water contaminated by high concentrations of oxygenated hydrocarbons, i.e., MTBE, and aromatic products, i.e., BTEX, with the system in succession consisting of Y zeolite followed by ZSM-5/mordenite.
Figure 11:
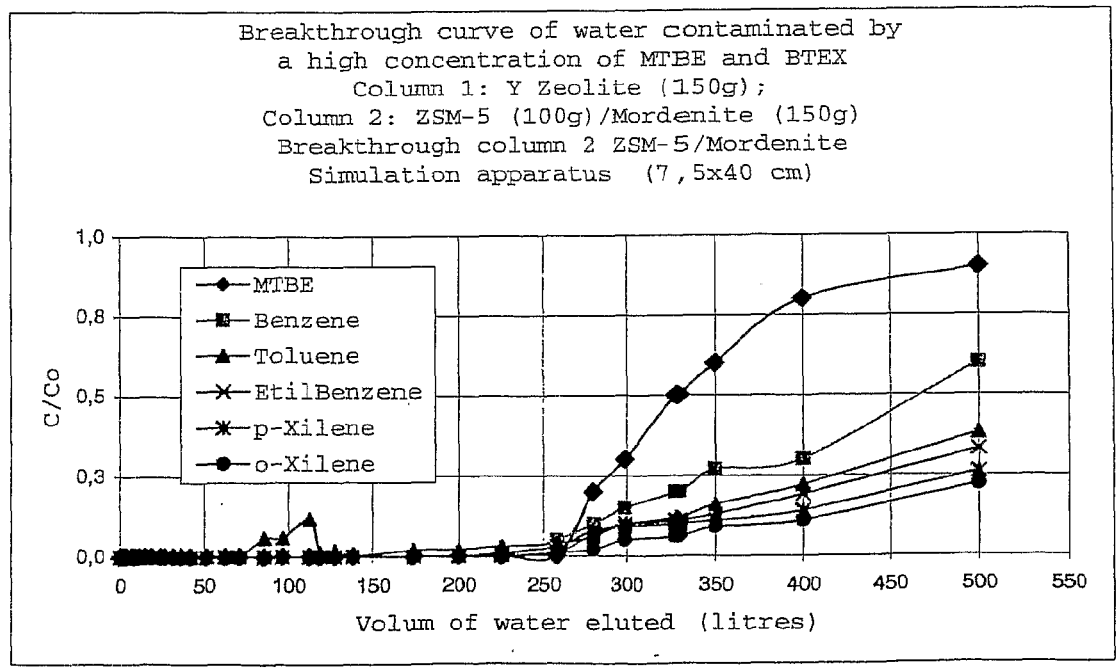

The results are shown in FIG. 11. The Y Zeolite immobilizes most of the Benzene, present in a high concentration of about 22 ppm, whereas the second column removes the other contaminants, with Mordenite being particularly effective for MTBE.

EXAMPLE 15

Synthetic water containing TPH with toluene and MTBE treated with a system consisting of a column of Y zeolite followed by two columns of mordenite/ZSM-5 and ZSM-5/mordenite.

The first column removes the TPH.

This is water containing 18 ppm of Total Petrol Hydrocarbons (TPH).

Figure 12:
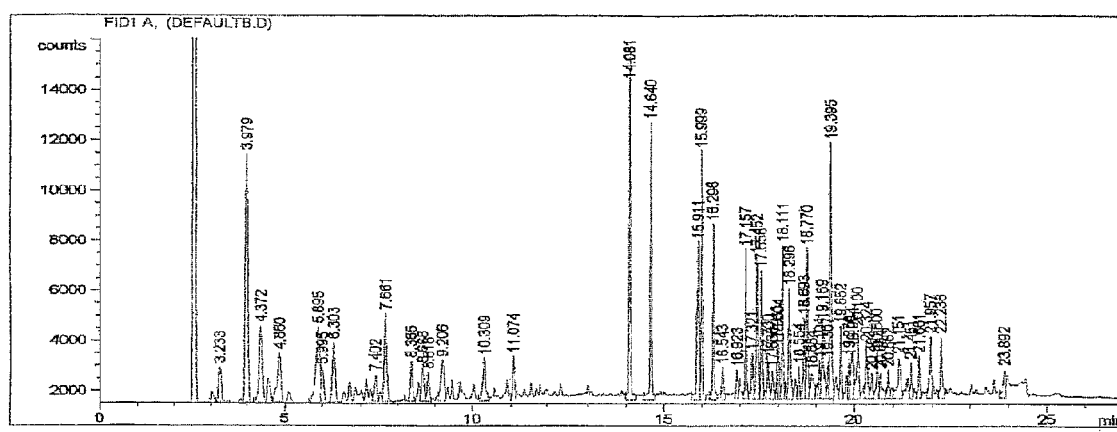
FIG. 12-13 show test results of synthetic water containing TPH with toluene and MTBE treated with a system consisting of a column of Y zeolite followed by two columns of mordenite/ZSM-5 and ZSM-5/mordenite.
Figure 13:
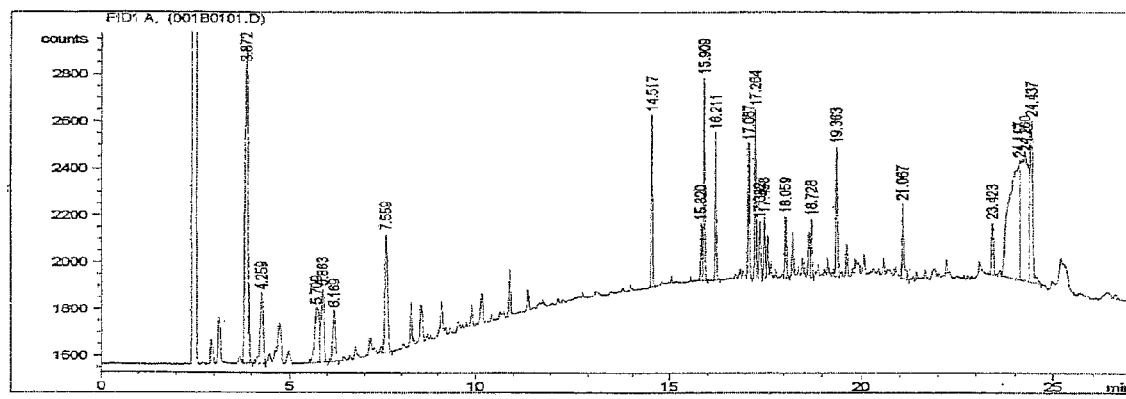
Figure 14:
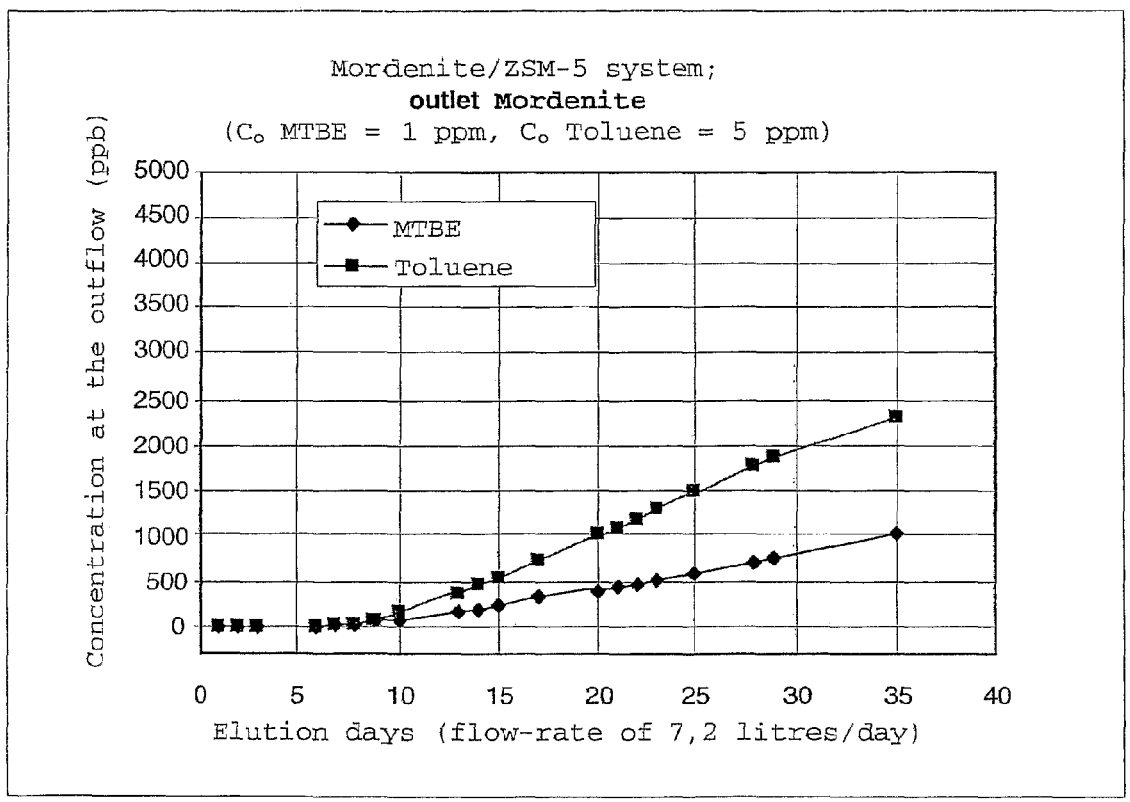
FIG. 14-17 show the results at the outlet of each column of Example 15.
Figure 15:
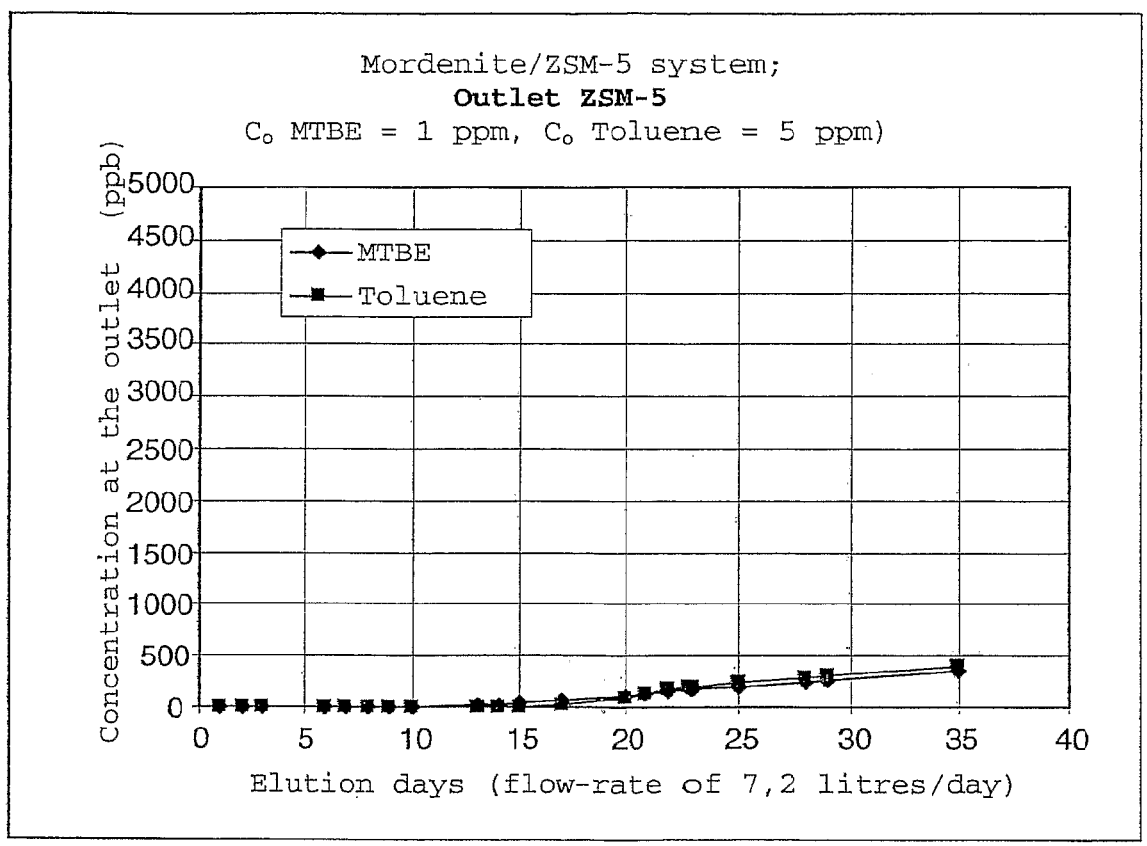
Figure 16:
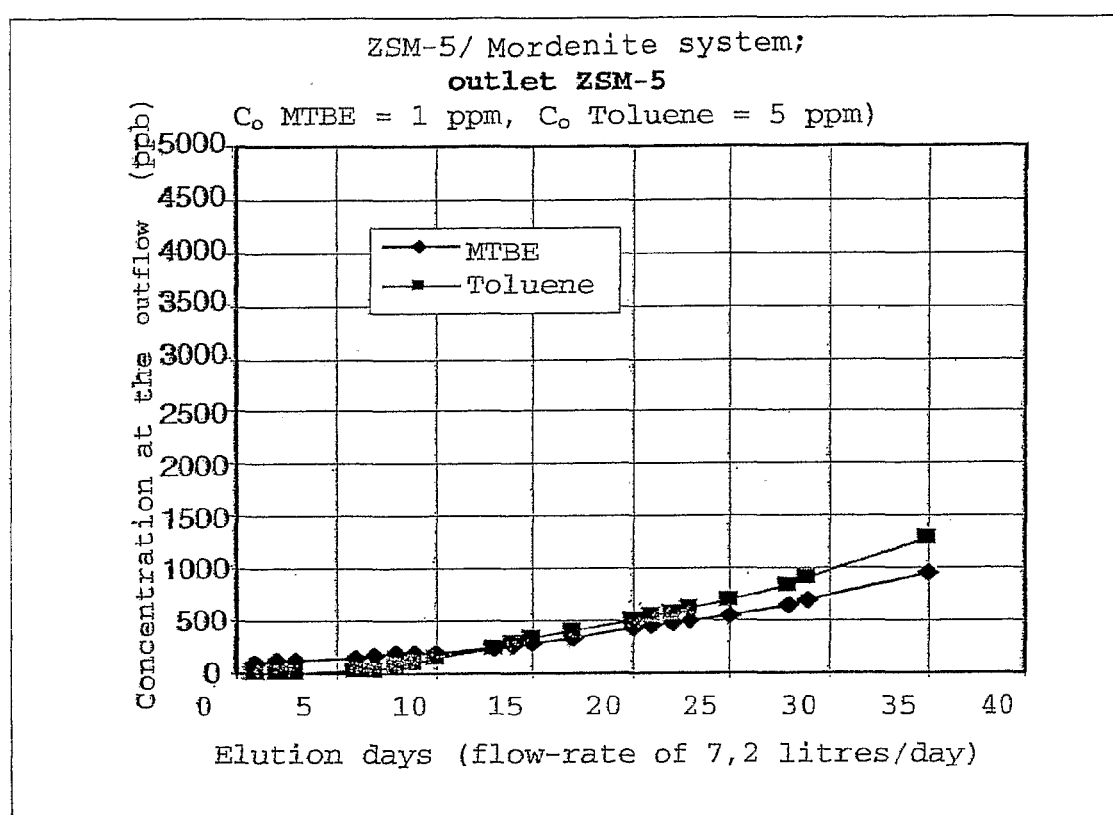
Figure 17:
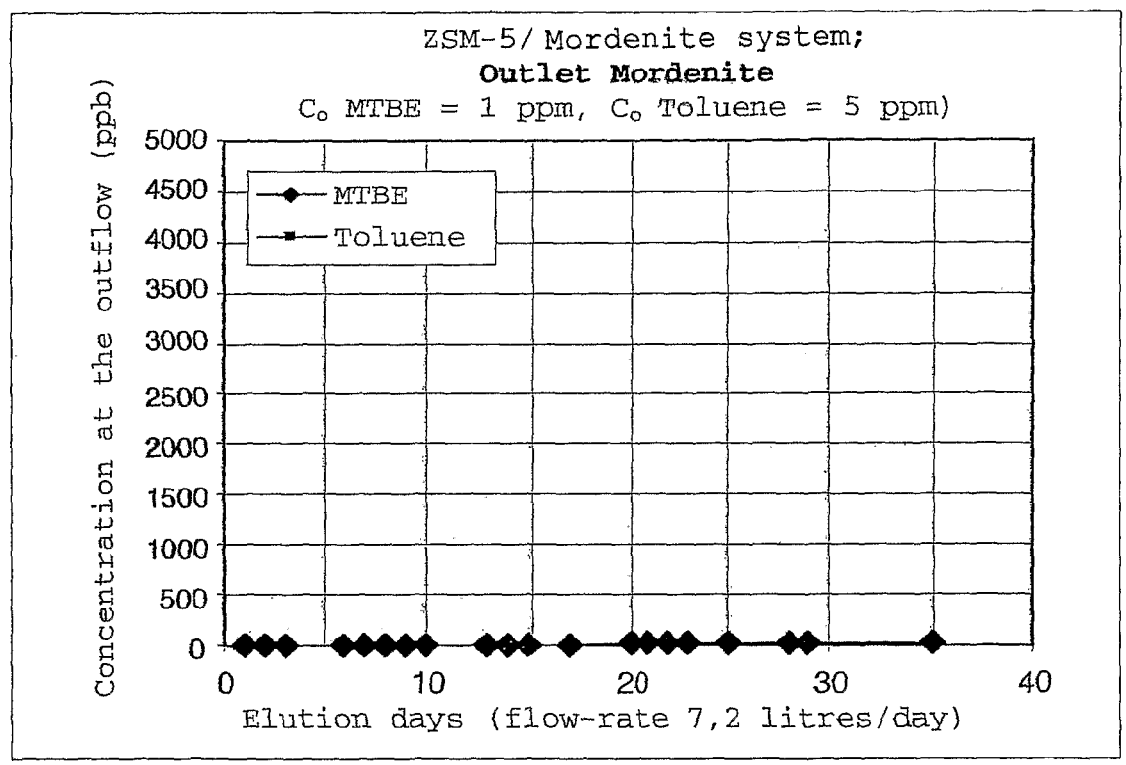

The gas chromatograms of the water, at the inlet and outlet of the simulation apparatus consisting of a 2.5×10 cm column containing 23 g of Y Zeolite (elution flow-rate 30 ml/min), are indicated in FIGS. 12 and 13.

The difference in scale of the two chromatograms clearly shows the reduction in the level of TPH at the inlet and outlet of the apparatus; an accurate peak by peak analysis of the chromatogram shows that over 98% is immobilized in Y Zeolite.

The system of the two successive columns allows the removal of MTBE and Toluene.

The results at the outlet of each column are indicated in FIGS. 14, 15, 16 and 17.

The first system, with Mordenite in first position, causes the most immediate saturation of the Mordenite with toluene, thus reducing the performances of this zeolite with respect to the more difficult contaminant to be removed, MTBE. In the second case, however, the Mordenite is protected by the ZSM-5. The second system surprisingly behaves considerably better than the first: with the same feeding, the first is at 500 ppb in elution, the second is lower than 10 ppb.

TABLE 1

Removal of Arsenic: comparison between formulated synthetic zeolite Mordenite (50% Al$_2$O$_3$) and commercial systems (Cabazite, ZS500RW; Cabazite + FeSO$_4$ ZS500As)

| Adsorbent (50 mg) | Initial Arsenic in solution (μg/L) | Final Arsenic in solution (μg/L) |
|---|---|---|
| Zs500As | 500 | 226 |
| Mordenite | 500 | 141 |
| ZS500 RW | 500 | 338 |

TABLE 2

Removal of different concentrations of Arsenic with zeolites with different quantities of ligand (50% Al$_2$O$_3$ for Mordenite, 25% Al$_2$O$_3$ for ZSM-5)

| Adsorbent (50 mg) | Initial As (μg/L) | Final As (μg/L) |
|---|---|---|
| Mordenite | 1000 | 351 |
|  | 500 | 151 |
|  | 250 | 85 |
|  | 100 | 38 |
| ZSM-5 | 1000 | 639 |
|  | 500 | 329 |
|  | 250 | 163 |
|  | 100 | 63 |

TABLE 3

Removal of hexavalent Chromium with zeolites with the same quantity of ligand (Al$_2$O$_3$ 25%)

| Adsorbent (50 mg) | Initial Cr (μg/L) | Final Cr (μg/L) |
|---|---|---|
| Mordenite | 1000 | 236 |
|  | 500 | 43 |
|  | 250 | 33 |
|  | 100 | 28 |
| ZSM-5 | 1000 | 250 |
|  | 500 | 72 |
|  | 250 | 44 |

TABLE 4

Adsorption of Benzene with Y Zeolite and ZSM-5 individually, in a mixture and in succession.

| Adsorbent | Quantity adsorbent (mg) | Initial Benzene (mg/l) | Benzene adsorbed (%) | Benzene remaining in solution (mg/l) |
|---|---|---|---|---|
| ZSM-5 | 5 | 70 | 15 | 59.5 |
| Y Zeolite | 5 | 70 | 70 | 21 |
| Y Zeolite + ZSM-5 (mix) | 5 | 70 | 20 | 56 |
| Y Zeolite followed by ZSM-5 (succession) | 5 | 70 | 98 | 1.4 |

TABLE 5

Adsorption of Toluene with Y Zeolite and ZSM-5 individually, in a mixture and in succession.

| Adsorbent | Quantity adsorbent (mg) | Initial Toluene (mg/l) | Toluene adsorbed (%) | Toluene remaining in solution (mg/l) |
|---|---|---|---|---|
| ZSM-5 | 5 | 60 | 20 | 48 |
| Y-Zeolite | 5 | 60 | 62 | 22.8 |
| ZSM-5 + Y Zeolite (mix) | 5 | 60 | 30 | 42 |
| Y Zeolite followed by ZSM-5 (succession) | 5 | 60 | 99 | 0.6 |

TABLE 6

Adsorption of p-xylene with Y Zeolite and ZSM-5 individually, in a mixture and in succession.

| Adsorbent | Quantity adsorbent (mg) | Initial p-xylene (mg/l) | p-xylene adsorbed (%) | p-xylene solution (mg/l) |
|---|---|---|---|---|
| ZSM-5 | 5 | 40 | 71.6 | 11.37 |
| Y-Zeolite | 5 | 40 | 86.37 | 5.46 |
| ZSM-5 + Y Zeolite (mix) | 5 | 40 | 75 | 10 |
| Y Zeolite followed by ZSM-5 (succession) | 5 | 40 | 99.95 | 0.018 |

TABLE 7

Adsorption of Chloro-benzene (CB) with Y Zeolite and ZSM-5 individually, in a mixture and in succession.

| Adsorbent | Quantity adsorbent (mg) | Initial CB (mg/l) | CB adsorbed (%) | CB remaining in solution (mg/l) |
|---|---|---|---|---|
| ZSM-5 | 5 | 40 | 76.7 | 9.31 |
| Y-Zeolite | 5 | 40 | 96.17 | 1.53 |
| ZSM-5 + Y Zeolite (mix) | 5 | 40 | 83 | 6.8 |

TABLE 7-continued

Adsorption of Chloro-benzene (CB) with Y Zeolite and ZSM-5 individually, in a mixture and in succession.

| Adsorbent | Quantity adsorbent (mg) | Initial CB (mg/l) | CB adsorbed (%) | CB remaining in solution (mg/l) |
|---|---|---|---|---|
| Y Zeolite followed by ZSM-5 (succession) | 5 | 40 | 99.98 | 0.007 |

TABLE 8

Adsorption of PCE with Y Zeolite and ZSM-5 individually, in a mixture and in succession.

| Adsorbent | Quantity adsorbent (mg) | Initial PCE (mg/l) | PCE adsorbed (%) | PCE remaining in solution (mg/l) |
|---|---|---|---|---|
| ZSM-5 | 5 | 40 | 89.6 | 4.17 |
| Y-Zeolite | 5 | 40 | 93.6 | 2.56 |
| ZSM-5 + Y Zeolite (mix) | 5 | 40 | 92 | 3.2 |
| Y Zeolite followed by ZSM-5 (succession) | 5 | 40 | 99.94 | 0.022 |

TABLE 9

Adsorption of TCE with Y Zeolite and ZSM-5 individually, in a mixture and in succession.

| Adsorbent | Quantity adsorbent (mg) | Initial TCE (mg/l) | TCE adsorbed (%) | TCE remaining in solution (mg/l) |
|---|---|---|---|---|
| ZSM-5 | 5 | 80 | 79.6 | 16.3 |
| Y-Zeolite | 5 | 80 | 91.5 | 6.8 |
| ZSM-5 + Y Zeolite (mix) | 5 | 80 | 82 | 14.4 |
| Y Zeolite followed by ZSM-5 (succession) | 5 | 80 | 99.5 | 0.4 |

TABLE 10

Experimental data used for constructing the adsorption isotherm of 1,2-DCA in ZSM-5 (FIG. 2)

| $C_0$ DCA (ppm) | DCA (µg/20 ml) | ZSM-5 (mg) | DCA adsorbed (µg) | Residual DCA in solution (µg) | $C_e$ DCA (ppm) |
|---|---|---|---|---|---|
| 200 | 4000 | 5.1 | 824.8 | 3175.2 | 158.76 |
| 100 | 2000 | 5.0 | 810.0 | 1190.0 | 59.50 |
| 50 | 1000 | 5.0 | 510.0 | 490.0 | 24.50 |
| 25 | 500 | 5.1 | 305.8 | 194.2 | 9.71 |
| 10 | 200 | 5.2 | 158.3 | 41.7 | 2.09 |
| 2 | 40 | 5.1 | 34.0 | 6.0 | 0.30 |
| 1 | 20 | 5.0 | 16.8 | 3.2 | 0.16 |
| 0.5 | 10 | 5.2 | 8.6 | 1.4 | 0.07 |
| 0.25 | 5 | 5.1 | 4.24 | 0.76 | 0.04 |
| 0.125 | 2.5 | 5.1 | 2.10 | 0.40 | 0.02 |
| 0.062 | 1.25 | 5.0 | 1.05 | 0.20 | 0.01 |

$C_0$ DCA = initial concentration of 1,2 DCA
$C_e$ DCA = concentration of 1,2 DCA at equilibrium

TABLE 11

Contamination trend along the simulation system after elution of 75 liters of groundwater

| Height cm (g. zeolite) | 1,2-DCA | PCE | TCE | 1.2-DCE | VC | HCA | HCBd |
|---|---|---|---|---|---|---|---|
| | | | | µg/l (initial %) | | | |
| Feed to the system | 37000 (100) | 3500 (100) | 2000 (100) | 3160 (100) | 3300 (100) | 1600 (100) | 1420 (100) |
| 6 (7.5) | 36700 (99.2) | 2980 (85) | 1600 (80) | 3000 (95) | 2900 (88) | 1.5 (94) | 1.38 (97) |
| 12 (15) | 15080 (40) | 650 (19) | 250 (12.5) | 300 (9) | 310 (9) | 1.45 (91) | 1.35 (95) |
| 15 (18.75) | 950 (2) | 54 (2) | 13 (0.6) | 9 (0.3) | 5 (0.1) | 1.44 (90) | 1.33 (94) |
| First column outflow | 46 (0.1) | <0.1 | <0.1 | <0.1 | <0.1 | 1.42 (89) | 1.32 (93) |
| System outflow | <0.1 | <0.1 | <0.1 | <0.1 | <0.1 | <0.1 | <0.1 |

The invention claimed is:

1. A process for the treatment of water contaminated by apolar organic compounds and/or heavy metals which consists in circulating water through a system comprising at least two types of zeolites having a silica/alumina ratio >50, placed in succession, wherein the first zeolite through which the water is passed is characterized by a high adsorption capacity and structural channel dimensions ranging from 7 to 50 Å, whereas the second is characterized by a high removal capacity of molecules with a molecular diameter comparable with structural channel dimensions ranging from 5 to 7 Å.

2. The process according to claim 1, wherein the zeolites are in the form of formulates with ligands selected from alumina, silica, clay.

3. The process according to claim 2, wherein the ligands form from 20 to 60% by weight of the formulate.

4. The process according to claim 1, wherein the zeolites have a silica/alumina ratio >200.

5. The process according to claim 1, wherein the zeolite characterized by structural channels having dimensions of 7-50 Å, is selected from the group consisting of Y Zeolite, beta zeolite, MSA, ERS-8 and MCM-41.

6. The process according to claim 5, wherein the zeolite characterized by structural channels having dimensions of 7-50 Å, is Y Zeolite.

7. The process according to claim 1, wherein the zeolite characterized by structural channels having dimensions of 5-7 Å, is selected from the group consisting of silicalite, ZSM-5 zeolite and mordenite.

8. The process according to claim 7, wherein the zeolite characterized by structural channels having dimensions of 5-7 Å, is ZSM-5.

9. The process according to claim 1, wherein the water is contaminated by at least one of the apolar organic compounds selected from the group consisting of styrene, p-xylene, benzo-anthracene, benzo-pyrene, benzo-fluoroanthene, benzo-perylene, chrysene, pyrene; halogenated solvents such as carbon tetrachloride, tetrachloro-ethylene, trichloro-ethylene, 1,2-cis-dichloro-ethylene, 1,2-trans-dichloro-ethylene, 1,1-dichlor-ethane, 1,2-dichloro-ethane, hexachloro-ethane, hexachloro-butadiene, vinyl chloride, chloro-methane, trichloro methane, 1,1-dichioroethylene, 1,2-dichloropropane, 1,1,2-trichloro-ethane, 1,2,3-trichloropropane, 1,1,2,2-tetrachloro-ethane, mono-chlorobenzene, 1,2-dichlorobenzene, 1,4-dichloro-benzene, 1,2,4-trichlorobenzene, 1,2,4,5-tetrachloro-benzene, pentachlorobenzene, hexachlorobenzene, 2-chlorophenol, 2,4-dichiorophenol, 2,4,6-tri-chlorophenol, pentachiorophenol, methyl tert-butylether (MTBE), ethyl-tert-butylether, tert-amyl-methyl-ether, BTEX (benzene, toluene, ethyl benzene, xylenes), styrene, naphthalene, 2-methyl-naphthalene, acenaphthene, phenanthrene.

10. The process according to claim 1, wherein the water is contaminated by at least one of the heavy metals selected from the group consisting of arsenic, hexavalent chromium, antimony, selenium, mercury, cadmium, cobalt, nickel, lead, manganese and copper.

11. The process according to claim 1, wherein the water is circulated though a system comprising Y Zeolite as first zeolite and ZSM-5 as second zeolite.

12. The process according to claim 1, wherein the apolar organic compounds are present at concentrations ranging from 5 to 2000 ppm.

13. The process according to claim 12, wherein the apolar organic compounds are present at concentrations ranging from 30 to 100 ppm.

14. The process according to claim 1, wherein the heavy metals are present at concentrations ranging from 0.01 to 20 ppm.

15. The process according to claim 14, wherein the heavy metals are present at concentrations ranging from 0.1 to 5 ppm.

16. The process according to claim 1, wherein the water is contaminated by aliphatic, halogen-aliphatic and mono-aromatic molecules and is circulated through a system comprising ZSM-5 zeolite as second zeolite.

17. The process according to claim 1, wherein the water is contaminated by aromatic molecules with two or more aromatic rings, alkyl-substituted halogen, MTBE, and is circulated through a system comprising mordenite as second zeolite.

18. The process according to claim 1, wherein the water is contaminated by mixtures of hydrocarbons and MTBE and is circulated through a system comprising Y Zeolite, ZSM-5 zeolite and mordenite, placed in succession, wherein the first zeolite through which the water is passed is Y Zeolite.

19. The process according to claim 1, wherein the treatment is effected on contaminated groundwater and the water is circulated through a permeable reactive barrier (PRB), situated in situ perpendicular to the groundwater flow, whose reactive medium consists of the system comprising at least two types of zeolites.

* * * * *